(12) United States Patent
Pereira Mosqueira et al.

(10) Patent No.: US 10,369,762 B2
(45) Date of Patent: Aug. 6, 2019

(54) IMPACT RESISTANT SANDWICH STRUCTURE

(71) Applicant: Airbus Operations, S.L., Getafe (Madrid) (ES)

(72) Inventors: Fernando Pereira Mosqueira, Madrid (ES); Andrea Ivan Marasco, Madrid (ES); Esteban Martino Gonzalez, Madrid (ES)

(73) Assignee: Airbus Operations, S.L. (ES)

( * ) Notice: Subject to any disclaimer, the term of this patent is extended or adjusted under 35 U.S.C. 154(b) by 0 days.

(21) Appl. No.: 15/448,800

(22) Filed: Mar. 3, 2017

(65) Prior Publication Data

US 2017/0253004 A1    Sep. 7, 2017

(30) Foreign Application Priority Data

Mar. 4, 2016  (EP) ..................................... 16382098

(51) Int. Cl.
*B32B 5/18* (2006.01)
*B32B 3/12* (2006.01)
(Continued)

(52) U.S. Cl.
CPC ............ *B32B 3/12* (2013.01); *B29D 99/0089* (2013.01); *B32B 3/02* (2013.01); *B32B 5/26* (2013.01);
(Continued)

(58) Field of Classification Search
CPC ......... B32B 3/12; B32B 15/016; B32B 15/00; B32B 2307/558; B32B 2571/00
See application file for complete search history.

(56) References Cited

U.S. PATENT DOCUMENTS 4,271,219 A * 6/1981 Brown ...................... B32B 3/12
                                                        156/292
4,550,046 A * 10/1985 Miller .................. B29D 24/005
                                                        428/116
(Continued)

FOREIGN PATENT DOCUMENTS

EP      1 125 704 A1    8/2001

OTHER PUBLICATIONS

Jeom Kee Paik, The strength characteristics of aluminum honeycomb sandwich panels, 1999, 205-231.*
(Continued)

*Primary Examiner* — David Sample
*Assistant Examiner* — Mary I Omori
(74) *Attorney, Agent, or Firm* — Lerner, David, Littenberg, Krumholz & Mentlik, LLP

(57) ABSTRACT

A sandwich structure architecture for high speed impact resistant structure includes sandwich skins which enclose a sandwich core formed by a plurality of spacing layers and a plurality of trigger layers, wherein these layers are stacked alternatively in the core. The walls of the trigger layers are thicker than the walls of the spacing layers and/or the walls of the trigger layers include at least one part inclined with respect to the walls of the spacing layers. The spacing and the trigger layers are made of the same type of material, preferably composite materials or metallic materials. The structure is capable of absorbing high-speed impacts, and at the same time can be used as load carrying structure in aircraft fuselages, wings, vertical or horizontal stabilizers.

12 Claims, 5 Drawing Sheets

(51) Int. Cl.
    *B32B 15/01*      (2006.01)
    *B32B 27/20*      (2006.01)
    *B32B 5/26*       (2006.01)
    *B32B 5/28*       (2006.01)
    *B32B 7/02*       (2019.01)
    *B32B 15/20*      (2006.01)
    *B29D 99/00*      (2010.01)
    *B32B 3/02*       (2006.01)
    *B64C 1/06*       (2006.01)
    *B33Y 80/00*      (2015.01)

(52) U.S. Cl.
    CPC .................. *B32B 5/28* (2013.01); *B32B 7/02* (2013.01); *B32B 15/01* (2013.01); *B32B 15/016* (2013.01); *B32B 15/20* (2013.01); *B32B 27/20* (2013.01); *B33Y 80/00* (2014.12); *B64C 1/062* (2013.01); *B32B 2250/03* (2013.01); *B32B 2250/05* (2013.01); *B32B 2250/40* (2013.01); *B32B 2307/50* (2013.01); *B32B 2307/558* (2013.01); *B32B 2571/00* (2013.01); *B32B 2605/18* (2013.01)

(56) References Cited

U.S. PATENT DOCUMENTS

| | | | |
|---|---|---|---|
| 5,106,668 A * | 4/1992 | Turner | B32B 3/12 |
| | | | 428/116 |
| 5,460,865 A * | 10/1995 | Tsotsis | B32B 3/12 |
| | | | 428/116 |
| 2005/0042416 A1* | 2/2005 | Blackmon | B32B 3/12 |
| | | | 428/116 |

OTHER PUBLICATIONS

Inclined Definition, Merriam-Webster.*
Search Report EP 16382098.8 dated Sep. 21, 2016.

* cited by examiner (A)

(B)

IMPACT RESISTANT SANDWICH STRUCTURE

FIELD OF THE INVENTION

The present invention refers in general to high speed impact resistant structures as protection for aircrafts, helicopters and similar flying vehicles.

An aspect of the invention provides an architecture for impact resistant light-weight structure, with maximized energy absorption capability. At the same time, this structure can be integrated in an aircraft as load carrying structure.

The invention can be applied to aircraft components such as: fuselage, wings, vertical and horizontal stabilizers or engine cowlings (for example as rotor blade release protection).

BACKGROUND OF THE INVENTION

Composite sandwich structures—as a structural system made of skins which enclose a core—are used for many purposes, typically providing weight efficient solutions. Core materials can be made of hollow structures—cells—contributing to composite structure weight reduction.

Composite sandwich weight efficiency has led the aircraft industry to use this structural solution for stiffened panels across different aircraft components.

Current state of the art sandwich core solutions, do not present an ad-hoc layered trigger mechanism for impact energy absorption maximization. Stepwise graded as well as through-the-thickness reinforced core solutions may increase the overall energy absorption of the sandwich structures, although do not systematically prevent both impactor fragmentation and progressive failure at core level in the case of high speed impacts.

BRIEF SUMMARY OF THE INVENTION

Present invention provides an architecture for high speed impact resistant sandwich structure. The enhanced sandwich core is composed by a layered triggering mechanism which improves energy absorption capability, by favoring both impactor fragmentation and sandwich core progressive failure.

More specifically, the invention refers to an impact resistant structure comprising a sandwich core and preferably external upper and lower skins. A sandwich core is generally made of hollow structures—cells—. Core cells can have hexagonal (honeycomb), rectangular or any customized cross section. The triggering mechanism divides the core cells in layers parallel to the wet surface of the external skins.

Sandwich core is composed by an assembly of two different types of layers, namely a plurality of spacing layers and a plurality of trigger layers. These layers are stacked alternatively.

Spacing layers separate two consecutive trigger layers at a selected distance and provide continuity to the core, whereas the trigger layers are configured to fragment an object impacting against the structure.

Sandwich core is designed so the impactor can is be fragmented progressively as it passes through the core layers.

In a preferred embodiment, the core is manufactured in composite materials (for example glass or carbon fiber reinforced plastics). Trigger and spacing layers can either share the same material or combine two different materials (one for the spacing layers and another one for the trigger layers).

In another preferred embodiment, the core is manufactured in metallic materials (either a single alloy or a combination of alloys, preferably containing aluminum).

Trigger layers (fragmenting progressively the impactor) are designed such as trigger layers mass per unit of volume is larger than the one for spacing layers. Different solutions are proposed. For example, thickening trigger layer walls, compared to walls spacing layer walls. In a second example, alternatively or in addition to the thickness increment of trigger layer walls, they can include parts or segments inclined with respect to spacing layer walls. As an example, the core trigger layer walls are perpendicular to spacing layer walls.

BRIEF DESCRIPTION OF THE DRAWINGS

Preferred embodiments of the invention are henceforth described with reference to the accompanying drawings, wherein.

DETAILED DESCRIPTION

Figure 1:
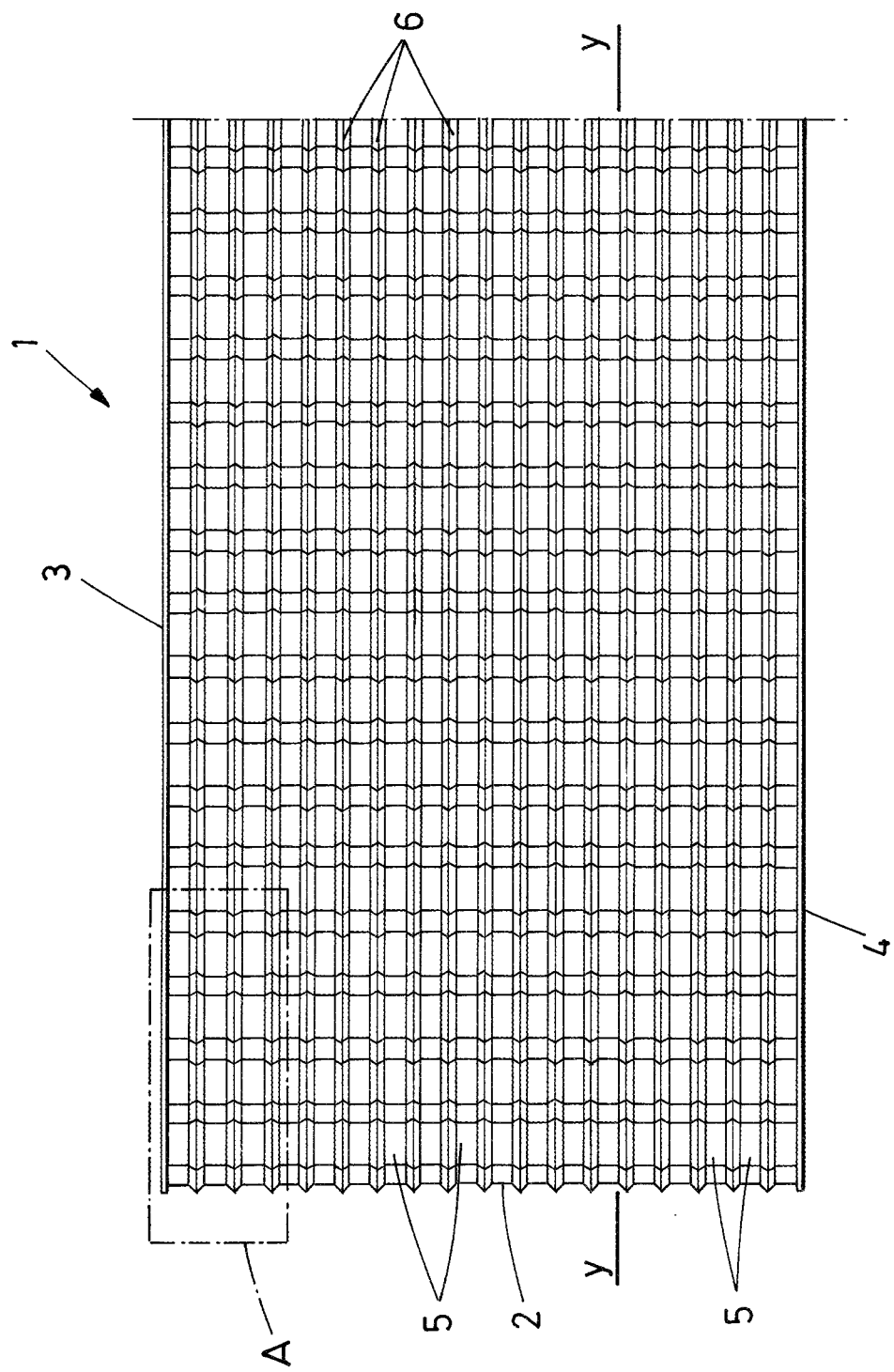
FIG. 1 shows a front view of a preferred embodiment of an impact resistant structure according to the invention.

FIG. 1 shows a preferred embodiment of an impact resistant structure (1), comprising a sandwich core (2) having external upper and lower skins (3,4) attached to the core (2) preferably by bonding. The sandwich core (2) comprises a plurality of spacing layers (5) and a plurality of trigger layers (6), wherein these layers (5,6) are stacked alternatively in the core as it can be seen in FIG. 1.

Figure 2:
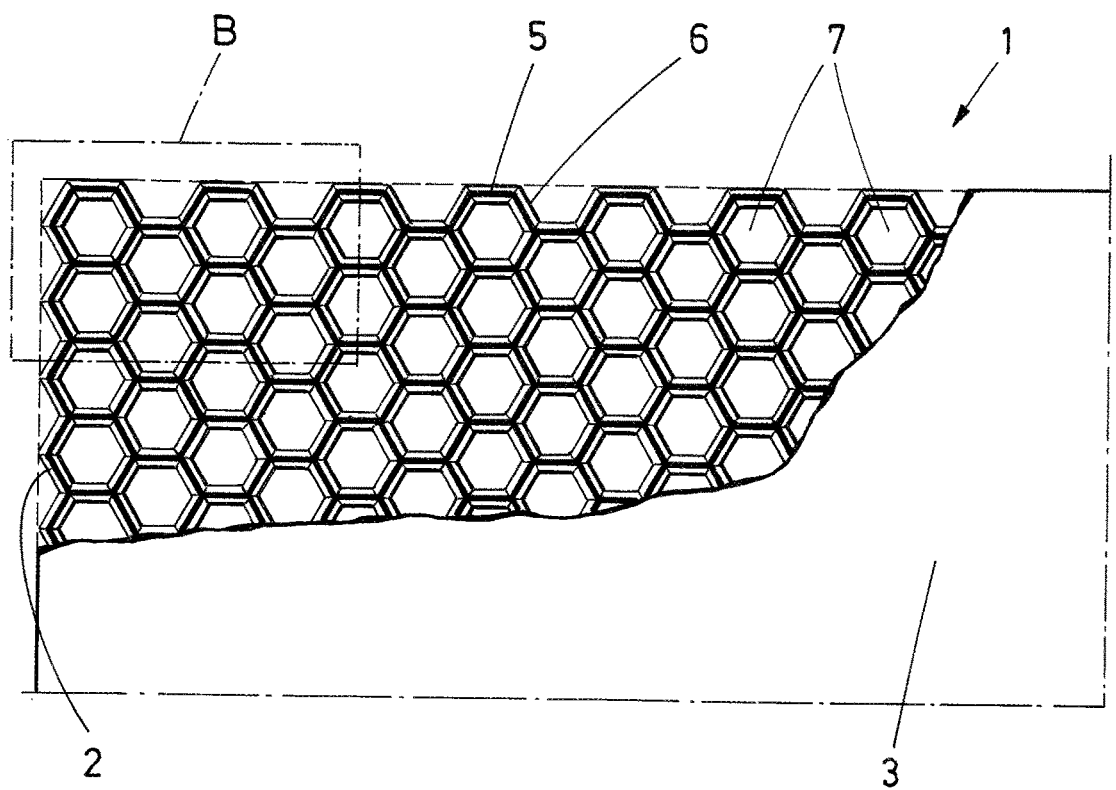
FIG. 2 shows a top plan view of the structure of FIG. 1 with the upper skin partially removed to show the core configuration.
Figure 3:
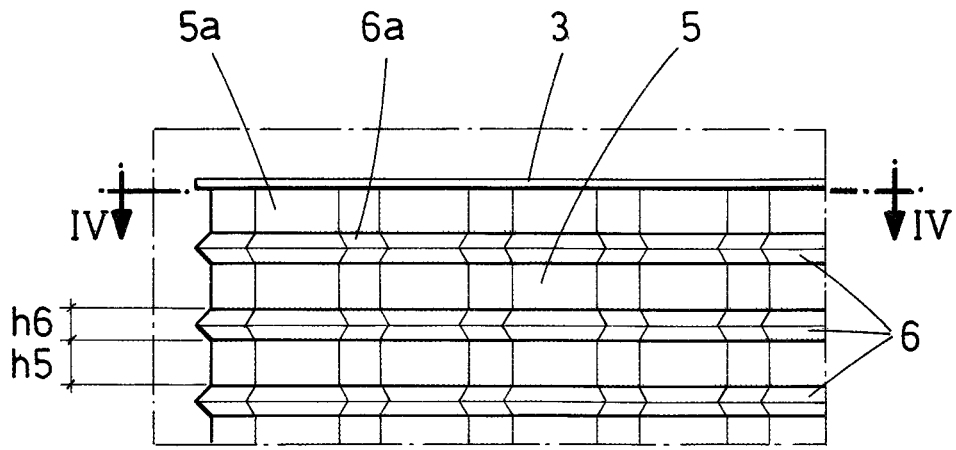
FIG. 3 shows an enlarged view of the portion (A) of FIG. 1.
Figure 4:
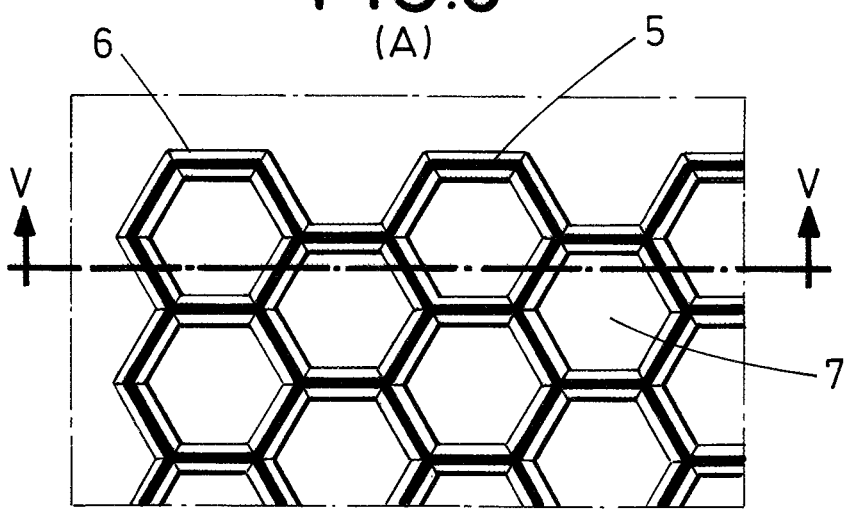
FIG. 4 shows an enlarged view of the portion (B) of FIG. 2, which corresponds to a view taken along cutting line IV-IV in FIG. 3.
Figure 5:
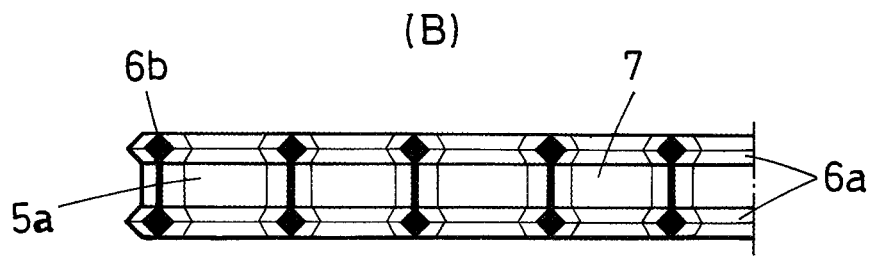
FIG. 5 shows a view taken along cutting line V-V in FIG. 4.

As shown in FIGS. 2 and 3, spacing and trigger layers (5,6) are multi-cell structures, having walls (5a,6a) (see FIG. 3) perpendicular to a plane (Y) preferably parallel to layers (5,6). In this preferred embodiment the multi-cell core has a honey-comb configuration, wherein each cell (7) (see FIG. 2) is defined by a surrounding wall in this case with hexagonal shape. Additionally, the spacing and trigger layers (5,6) (see FIG. 1) have substantially the same geometric configuration, except trigger layers walls which are thicker and shorter than the walls of the spacing layers. Spacing and trigger layers (5,6) (see FIG. 1) are stacked alternatively until sandwich height is achieved.

In other preferred embodiments, the cells (7) (see FIG. 2) of the layers (5,6) (see FIG. 1) can have different cross sections, such as rectangular, circular, elliptical etc.

Preferably, trigger layer walls (6a) are thicker than spacing layers walls (5a). This feature can be obtained in many different ways, for example in the exemplary embodiment represented in FIGS. 1 to 5 and 6E, trigger layer walls (6a) have a rhomboidal cross-section (6b).

Figure 6C:
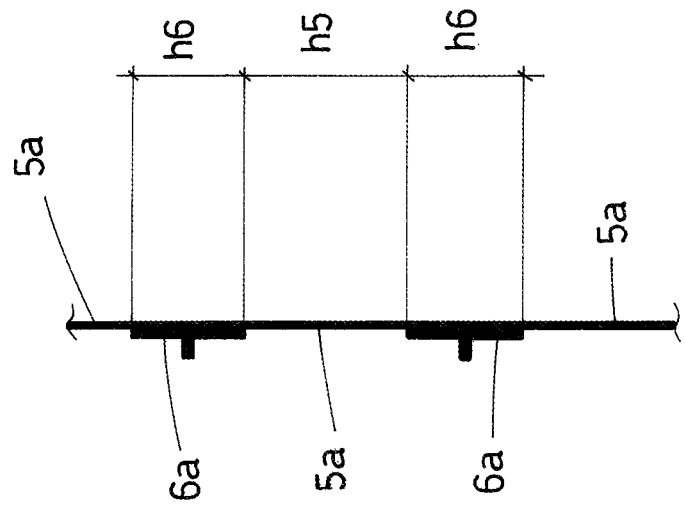
FIGS. 6A-6E show in cross-sectional views, alternative designs of the trigger layers, wherein only one vertical wall of the core is partially represented for the sake of clarity of the illustration.
Figure 6B:
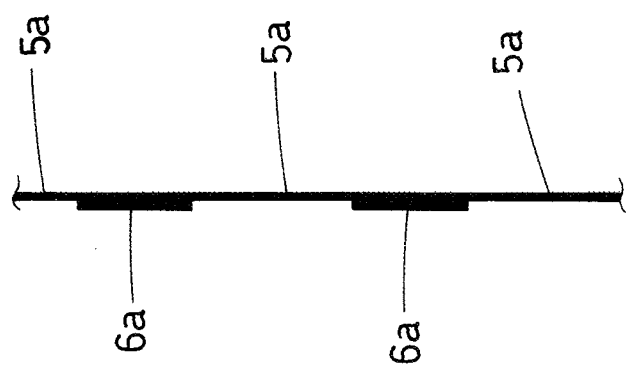

Alternatively as shown in FIG. 6B, instead of this rhomboidal cross-section, trigger layer walls (6a) are thicker than spacing layer walls (5a) and have no dedicated part or segment in a different plane than the one defined by spacing layer walls. In the embodiment of FIG. 6C, these walls (6a) have a T-shape cross-section.

Another relevant feature of the invention, common for all the above-described embodiments, is that spacing and trigger layers heights (h5,h6) are constant for most of the structure, and wherein the spacing layers (6) are higher than the trigger layers (5), that is h5>h6. Preferably, (h5) is 20%-40% higher than (h6).

Figure 6A:
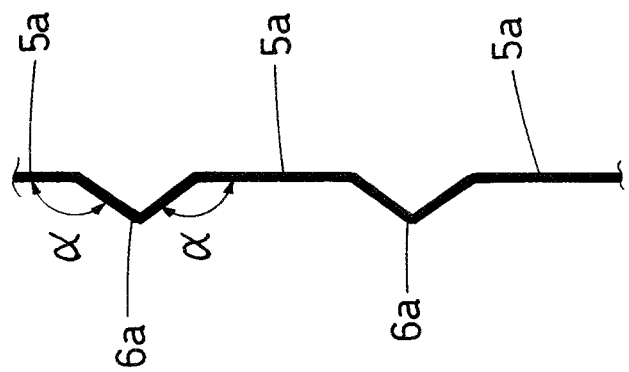

In the exemplary embodiment of FIG. 6A, spacing and trigger layer (5a,6a) walls have the same thickness. On top of this, the trigger layer walls (6a) have a V-shape cross-section. These walls (6a) have two inclined parts with respect to spacing layer walls (5a). An angle ($\alpha$) is defined between a trigger layer wall (6a) and its adjacent spacing layer wall (5a). Preferably, this angle ($\alpha$) is within the range 90° to 150°.

Figure 6D:
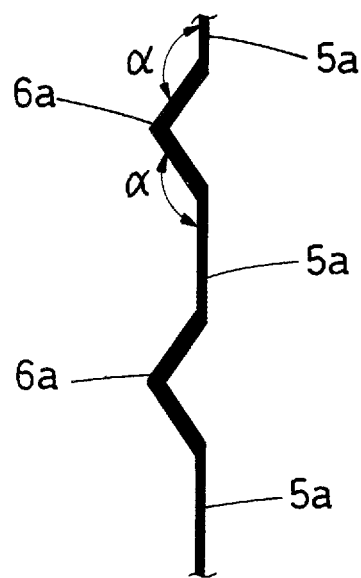
Figure 6E:
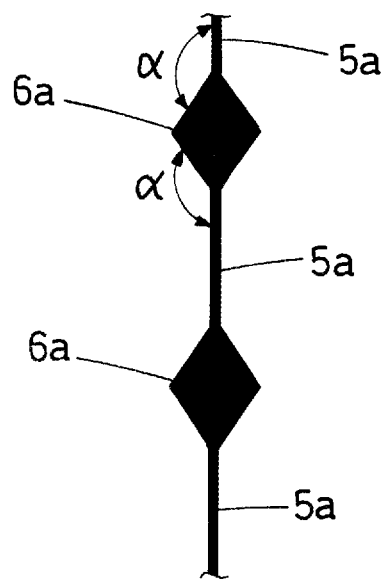

In the practical embodiment of FIG. 6A, the walls (6a) could also be thicker than the walls (5a), (FIG. 6D).

Impact resistant sandwich core depicted in FIGS. 1 to 6, can be manufactured for example in aluminum, composites, Nomex®, etc. In the case of composite materials, the entire assembly is obtained by co-curing and/or adhesive bonding the layers together. Other technologies, as becoming available and mature, could enable one-shot manufacturing favouring lead time and cost reduction (for example 3D printing).

The architecture of the sandwich core of the invention enhances the energy absorption capability due to the trigger layers configuration, acting as impactor (blade, bullet, bird, etc.) local damage initiator (hard points or reinforcements optimized layout) and favouring core progressive failure. The conjunction of these two mechanisms generates superior impact resistant sandwich cores, and maximizes the energy absorption of the sandwich core.

The use of the invention is especially advantageous for aircraft rotor blade release protection, for example in the case of open rotors or turbo-propellers powered aircrafts.

In a specific test case, an impact of a 16 kg rotor blade at speed of 171.5 m/s was absorbed by a sandwich structure of 490 mm total height and 1860 mm×2340 mm area.

Other preferred embodiments of the present invention are described in the appended dependent claims and the multiple combinations thereof.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A sandwich structure comprising:
    a sandwich core having upper and lower skins, the core comprising a plurality of spacing layers and a plurality of trigger layers, stacked together and alternatively arranged in the core,
    wherein the spacing and trigger layers are configured as multi-cell hollow structures having walls, disposed perpendicular to a plane substantially parallel to the upper and lower skins,
    wherein the spacing layers and the trigger layers are made of the same material, and wherein the trigger layers' mass per unit of volume is larger than the spacing layers' mass per unit of volume,
    wherein the walls of the trigger layers include at least one part inclined with respect to the walls of the spacing layers, and
    wherein the at least one inclined part forms an angle ($\alpha$) with the walls of adjacent spacing layers and extends from an end of the wall of the adjacent spacing layer, and wherein the angle ($\alpha$) is within the range of 90° to 150°.

2. The sandwich structure according to claim 1, wherein the walls of the trigger layers are thicker than the walls of the spacing layers.

3. The sandwich structure according to claim 1, wherein the walls of the trigger and spacing layers have substantially the same thickness.

4. The sandwich structure according to claim 1, wherein the walls of the trigger layers include a rhomboidal shape in a cross-sectional view.

5. The sandwich structure according to claim 1, wherein the spacing layers and trigger layers have respectively constant height, and wherein the spacing layers are higher than the trigger layers.

6. The sandwich structure according to claim 1, wherein the cells of the spacing and trigger layers have substantially the same shape in a top plan view of the layers.

7. The sandwich structure according to claim 1, wherein the upper and lower skins, spacing and trigger layers are made of a composite material.

8. The sandwich structure according to claim 1, wherein the upper and lower skins, the spacing and trigger layers are metallic.

9. A sandwich structure comprising:
    a sandwich core having upper and lower skins, the core comprising a plurality of spacing layers and a plurality of trigger layers, stacked together and alternatively arranged in the core,
    wherein the spacing and trigger layers are configured as multi-cell hollow structures having walls, disposed perpendicular to a plane substantially parallel to the upper and lower skins,
    wherein the spacing layers and the trigger layers are made of the same material,
    wherein the trigger layers' mass per unit of volume is larger than the spacing layers' mass per unit of volume, and
    wherein the walls of the trigger layer include a T-shaped configuration in a cross-sectional view having segments extending generally perpendicular from the walls of the trigger layer.

10. The sandwich structure according to claim 9, wherein the spacing layers and trigger layers have respectively constant height, and wherein the spacing layers are higher than the trigger layers.

11. The sandwich structure according to claim 9, wherein the upper and lower skins, the spacing and trigger layers are metallic.

12. The sandwich structure according to claim 9, wherein the upper and lower skins, spacing and trigger layers are made of a composite material.

\* \* \* \* \*